(12) United States Patent
Takasuka et al.

(10) Patent No.: US 7,319,390 B2
(45) Date of Patent: Jan. 15, 2008

(54) DATA PROCESSING APPARATUS, INTRUSION SENSOR AND ANTITHEFT APPARATUS

(75) Inventors: Hirofumi Takasuka, Hyogo (JP); Yoshihiro Sasaki, Hyogo (JP); Yasushi Seike, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 179 days.

(21) Appl. No.: 11/299,624

(22) Filed: Dec. 13, 2005

(65) Prior Publication Data

US 2006/0244591 A1 Nov. 2, 2006

(30) Foreign Application Priority Data

Dec. 16, 2004 (JP) ............................ P2004-363807
Nov. 7, 2005 (JP) ............................ P2005-322000

(51) Int. Cl.
  *G08B 13/00* (2006.01)
(52) U.S. Cl. .................. 340/541; 340/522; 345/440.1; 379/88.19
(58) Field of Classification Search ............. 340/426.1, 340/541, 545.1, 545.3, 522, 680, 683; 379/88.19, 379/88.21, 142.01; 369/44.13, 47.1; 345/440.1, 345/690
See application file for complete search history.

(56) References Cited

U.S. PATENT DOCUMENTS 4,988,979 A * 1/1991 Sasaki et al. ............... 340/683
5,815,035 A * 9/1998 Yamagishi et al. ......... 329/311
6,344,844 B1 * 2/2002 Timm et al. ............. 345/440.1
6,480,589 B1 * 11/2002 Lee et al. .............. 379/142.04
6,809,997 B2 * 10/2004 Park et al. ................. 369/47.1
7,095,681 B2 * 8/2006 Park et al. ............... 369/44.13
2003/0097870 A1 5/2003 Honda

FOREIGN PATENT DOCUMENTS

| JP | A 10-228299 | 8/1998 |
| JP | A 2001-108750 | 4/2001 |
| JP | A 2001-249156 | 9/2001 |
| JP | A 2002-84190 | 3/2002 |
| JP | A 2004-142660 | 5/2004 |

* cited by examiner

Primary Examiner—Van T. Trieu
(74) Attorney, Agent, or Firm—Oliff & Berridge, PLC

(57) ABSTRACT

A data processing apparatus executes data processing with respect to an output of A/D conversion of an input signal. The data processing apparatus includes a high-frequency noise recognition unit. The high-frequency noise recognition unit detects number of peaks of waveforms of the input signal on a basis of the output of the A/D conversion. The high-frequency noise recognition unit determines whether or not the number of the peaks, which has been detected within a predetermined time, is equal to or larger than a predetermined value.

30 Claims, 13 Drawing Sheets

INPUT WAVEFORM
0.1V OFFSET VALUE

PEAKS

NUMBER OF PEAKS

INTEGRATION VALUE (100ms)
INTEGRATION INTERVAL

INPUT WAVEFORM

TIME TO PEAK

INTEGRATION OF TIME TO PEAKS

DATA PROCESSING APPARATUS, INTRUSION SENSOR AND ANTITHEFT APPARATUS

This application is based upon and claims the benefit of priority from Japanese Patent Application No. 2004-363807 filed on Dec. 16, 2004 and Japanese Patent Application No. 2005-322000 filed on Nov. 7, 2005, the entire contents of which are incorporated herein by reference.

BACKGROUND OF THE INVENTION

1. Field of the Invention

The invention relates to a data processing apparatus for executing data processing, such as detecting features of waveforms, based on an input signal, which is an output of an A/D conversion, and particularly to a data processing apparatus, which can prevent malfunction due to noise, an intrusion sensor using the data processing apparatus and an antitheft apparatus using the intrusion sensor.

2. Description of the Related Art

There are a large number of apparatus, which perform a certain control on the basis of a signal acquired from a certain sensor. For example, a vehicular security apparatus issues any alarm or reports, by radio, that an illegal intrusion into a prescribed place has occurred upon detecting, during arming, illegal door opening, an intrusion into the passenger compartment, vehicle vibration, breaking of glass, or the like. An intrusion sensor used in this security system detects whether or not an illegal intrusion into the vehicle has occurred by extracting a waveform variation due to a movement of an object (see JP 2004-142660A, for example).

SUMMARY OF THE INVENTION

FIG. 15 is a block diagram showing the configuration of a general security system. Incorporating a keyless entry function for a locking control, a security ECU 51 performs a vehicle door locking/unlocking control and a door opening/closing control and issues an alarm upon occurrence of, for example, an intrusion into the passenger compartment using an illegal means. The security ECU 51 also performs an arming/disarming control, a vehicle door locking/unlocking control, etc. in response to a request signal sent from a transmitter 52.

The transmitter 52 has a lock button L and an unlock button U. Security is set (i.e., arming is effected) when the lock button L is depressed, and security is reset (i.e., disarming is effected) when the unlock button U is depressed.

A courtesy switch (SW) 53, a hood switch (SW) 54, an intrusion sensor 55, a vibration sensor 56, an IG switch (SW) 57, a lock position switch (SW) 58, a locking motor 59, a horn 60, and a hazard lamp 61 are connected to the security ECU 51. The courtesy SW 53 detects a door opening/closing state. The hood SW 54 detects a hood opening/closing state. The intrusion sensor 55 detects an intrusion into the passenger compartment and an event that a door has been opened by a method other than the regular method. The vibration sensor 56 detects vibration of the vehicle. The IG SW 57 detects an on/off switching state of the ignition switch. The lock position SW 58 detects unlocking. Outputs of the above switches and sensors are input to the security ECU 51. The locking motor 59 drives a door locking mechanism for locking and unlocking the doors. The horn 60 and the hazard lamp 61 perform alarm operations at the time of alarming.

FIG. 16 shows an example of the intrusion sensor 55 and is a block diagram showing the configuration of an intrusion sensor using a high-frequency signal of a millimeter band. A 4-MHz high-frequency signal that is output from an oscillation circuit 61A is frequency-multiplied and amplified by the frequency-multiplier/amplifier circuit 62 into a 24-GHz frequency signal, which is transmitted from a transmission antenna 63. Reflection waves that are produced by reflection, by a nearby object, of transmission radio waves emitted from the transmission antenna 63 are received by a reception antenna 64. A reception signal from the reception antenna 64 is mixed with the transmission signal from the frequency-multiplier/amplifier circuit 62 by a mixing circuit 66, and a resulting mixed signal is input to a detection circuit 67.

The detection signal 67 detects, as a beat signal, a frequency component whose frequency is equal to the difference between the frequencies of the reception signal and the transmission signal. A microcomputer 68 detects whether or not an illegal intrusion into the vehicle has occurred by extracting a waveform variation due to a movement of an object on the basis of data obtained by A/D-converting the output of the detection circuit 67.

Like the above intrusion sensor, a data processing apparatus using a microcomputer which data-processes an input signal digitizes a signal from the sensor by sampling it with an A/D converter and performs judgment processing on the basis of the digital signal with a data processing circuit.

In this case, if the sampling period is short, an A/D-converted signal is close to an original signal in waveform. However, if the sampling period is long, an A/D-converted signal is much different in waveform from an original signal and the waveform of the original signal cannot be recognized from that of the A/D-converted signal. Therefore, usually, where a maximum frequency included in an original signal is fp, the sampling frequency is set at 2 fp or more.

If a signal whose frequencies are higher than frequency components that are necessary in the system is input to the sensor of the above data processing apparatus as external noise, the waveform of the signal whose frequencies are higher than the sampling frequency cannot be recognized. Therefore, the data processing apparatus cannot judge whether or not the received signal is external noise and hence may operate erroneously. It is therefore necessary to suspend data processing in the event of input of high-frequency noise.

To recognize the waveform of a high-frequency signal correctly, it is necessary to use a sampling frequency that is about 10 times its frequencies. However, increasing the A/D conversion sampling frequency of the microcomputer requires the microcomputer to be high in functionality and processing speed, which results in a problem that the cost of the data processing apparatus is increased.

Other data processing apparatus are known which detect a signal having an approximately constant time interval (the period is indefinite). However, when a signal having a constant period and steep rising edges, for example, a power on/off signal of a cell phone as shown in FIG. 17, is input to such a data processing apparatus, the data processing apparatus cannot recognize the waveform of the signal unless an A/D converter has a sufficiently high sampling frequency. This may cause an erroneous operation of the data processing apparatus.

The invention has been made in view of those problems described above, and provides a data processing apparatus, which can easily prevent malfunction without speeding up the sampling frequency of an A/D converter when a high-frequency noise is input or signals rising sharply and having a constant period.

According to an aspect of the invention, a data processing apparatus executes data processing with respect to an output of A/D conversion of an input signal. The data processing apparatus includes a high-frequency noise recognition unit. The high-frequency noise recognition unit detects number of peaks of waveforms of the input signal on a basis of the output of the A/D conversion. The high-frequency noise recognition unit determines whether or not the number of the peaks, which has been detected within a predetermined time, is equal to or larger than a predetermined value.

When the high-frequency noise recognition unit determines that the number of the peaks, which has been detected within the predetermined time, is equal to or larger than the predetermined value, the data processing may be disabled.

Furthermore, the high-frequency noise recognition unit may perform moving interval integral to detect the number of the peaks within the predetermined time According to these configurations, high-frequency components can be detected without speeding up the sampling frequency of the A/D converter. Therefore, the data processing can be executed with a low-price microcomputer without being affected by high-frequency noise.

Also, the high-frequency noise recognition unit may detect the number of the peaks using the peaks or bottoms of waveforms, which are undergone offset processing.

According to this configuration, the data processing apparatus can detects the number of the peaks of the waveforms only using the waveforms on one side of zero.

According to another aspect of the invention, a data processing apparatus executes data processing with respect to an output of A/D conversion of an input signal. The data processing apparatus includes a constant-period noise recognition unit. The constant-period noise recognition unit detects a period of each waveform of the input signal and a rising time of each waveform from a rising edge of each waveform to a peak of each waveform, on a basis of the output of the A/D conversion. The constant-period noise recognition unit determines whether or not waveforms having the substantially same period are input continuously and whether or not the rising times of the waveforms are shorter than a predetermined rising time. When the constant-period noise recognition unit determines that the waveforms having the substantially same period are input continuously and that the rising times of the waveforms are shorter than the predetermined rising time, the data processing is disabled.

Also, the constant-period noise recognition unit may integrate rising times of a particular number of waveforms to detect the rising times of the waveforms.

According to these configurations, signals having a constant period and rising sharply can be detected without speeding up the sampling frequency of the A/D converter. Therefore, the data processing can be executed with a low-price microcomputer without being affected by the signals having the constant period and rising sharply.

Also, the constant-period noise recognition unit may detect only a waveform having a period in a predetermined range.

When the constant-period noise recognition unit determines that the periods of the waveforms and the rising times of the waveforms are in respective predetermined ranges for a predetermined time, the data processing may be disabled.

According to these configurations, only the signals, which rise sharply, have a constant period and are likely to often occur, can be extracted.

Also, the determining unit may select a period of an nth waveform as a reference value where n is a natural number. The determining unit determines whether or not each waveform of the input signal is in a predetermined range from the reference value.

According to this configuration, since the period of the nth waveform is selected as the reference value, only waveforms, which have different frequencies but are continued, can be extracted. Thus, this configuration is advantageous when frequency band desired to be detected is broad.

Also, the high-frequency noise recognition unit may detect the number of peaks of the waveforms of the input signal on a basis of the output of the A/D conversion, using an nth waveform of the input signal and subsequent waveforms of the input signal where n is a natural number.

According to this configuration, after the waveforms become stable, the high-frequency noise recognition unit begins detecting the number of the peaks of the waveforms. Therefore, false recognition of the waveforms can be reduced.

Also, when an amplitude of each waveform is equal to or larger than another predetermined value, the high-frequency noise recognition unit may determine whether or not the number of the peaks, which has been detected within the predetermined time, is equal to or larger than the predetermined value.

Also, when an amplitude of each waveform is equal to or larger than another predetermined value, the constant-period noise recognition unit may detect whether or not the waveforms having the substantially same period are input continuously and whether or not the rising times of the waveforms are shorter than the predetermined rising time.

According to these configurations, false recognition due to variation of weak waveforms such as power-source noise and/or noise signals in a sensor can be prevented.

According to still another aspect of the invention, a data processing apparatus executes data processing with respect to an output of A/D conversion of an input signal. The data processing apparatus includes a noise recognition unit. The noise recognition unit includes a high-pass filter to which the input signal is input. When an output of the high-pass filter is equal to larger than a predetermined threshold value, the data processing is disabled.

According to this configuration, noise is recognized based on the output of the high-pass filter and the data processing is disabled based on the noise recognition result. Therefore, disabling the data processing can be implemented by hardware, which reduces load of a microcomputer. As a result, cost increase of the microcomputer can be suppressed. Also, the high-frequency noise recognition unit may detect the number of the peaks of the waveforms of the input signal for another predetermined time beginning at occurrence of the waveforms. After the high-frequency noise recognition unit has determined that the number of the peaks, which has been detected within the predetermined time, is less than the predetermined value, the data processing may be enabled.

Also, the constant-period noise recognition unit may detect the period of each waveform of the input signal and the rising time of each waveform for a predetermined time beginning at occurrence of the waveforms. After the constant-period noise recognition unit has determined that the waveforms having the substantially same period are not input continuously or that the rising times of the waveforms are equal to or longer than the predetermined rising time, the data processing may be enabled.

Also, the comparing unit may compare the output of the high-pass filter with the predetermined threshold value for a predetermined time beginning at occurrence of the waveforms. After the comparing unit has determined that the output of the high-pass filter is less than the predetermined threshold value, the data processing may be enabled.

Also, when the data processing has been disabled and an amplitude of the input signal continues to be equal to or lower than another predetermined value for another predetermined time, the data processing may be enabled.

Also, the high-frequency noise recognition unit may be prohibited from detecting the number of the peaks of the waveforms for another predetermined time beginning at occurrence of the waveforms.

Also, the constant-period noise recognition unit may be prohibited from detecting the period of each waveform of the input signal and the rising time of each waveform, for a predetermined time beginning at occurrence of the waveforms.

Also, the comparing unit is prohibited from comparing the output of the high-pass filter with the predetermined threshold value for a predetermined time beginning at occurrence of the waveforms.

Also, a plurality of different conditions for prohibition of the output of the determination result may be stored. The data processing may be disabled on a basis of logical sum of the respective conditions.

DETAILED DESCRIPTION OF EMBODIMENTS OF THE INVENTION

First Embodiment

Data processing apparatus according to embodiments of the invention will be hereinafter described with reference to the drawings.

Figure 1:
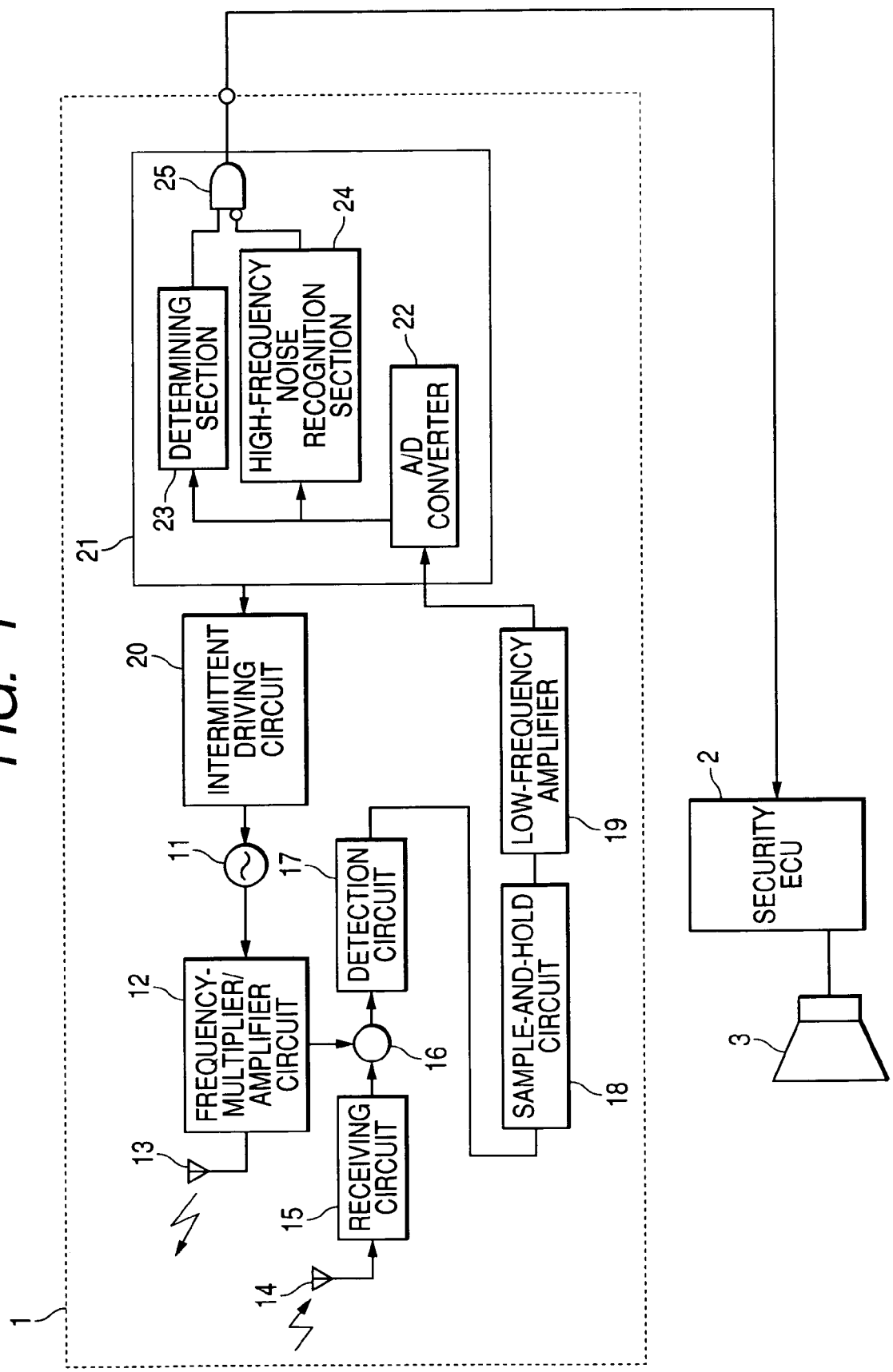
FIG. 1 is a block diagram showing the configuration of an intrusion sensor, which prohibits a judgment processing at the time of occurrence of high-frequency noise.

FIG. 1 is a block diagram showing the configuration of a system in which a data processing apparatus according to this embodiment is applied to an intrusion sensor of a security system. This system has an intrusion sensor 1, a security ECU 2, and a horn 3. The intrusion sensor 1 causes radio waves to spread over the entire passenger compartment. If detecting disorder in radio wave frequencies due to breaking of glass, a movement of a person in the passenger compartment, or the like, the intrusion sensor 1 informs the security ECU 2 of a detection result. And the security ECU 2 performs an alarm operation using the horn 2 or a hazard lamp (not shown).

The intrusion sensor 1 has an oscillation circuit 11, a frequency-multiplier/amplifier circuit 12, a reception antenna 14, a receiving circuit 15, a mixing circuit 16, a detection circuit 17, a sample-and-hold circuit 18, a low-frequency amplification circuit 19, an intermittent driving circuit 20, and a microcomputer 21. The oscillation circuit 11 generates a 4-MHz high-frequency signal. The frequency-multiplier/amplifier circuit 12 frequency-multiplies and amplifies an output of the oscillation circuit 11 and outputs a resulting signal to the transmission antenna 13, and causes part of the output signal to branch off and be output to the mixing circuit 16. The reception antenna receives reflection waves that are produced by reflection, by a nearby object, of transmission radio waves emitted from the transmission antenna 13. The receiving circuit 15 receives an output signal of the reception antenna 14. The mixing circuit 16 mixes a reception signal from the receiving circuit 15 with the transmission signal from the frequency-multiplier/amplifier circuit 12 and outputs a resulting mixed signal. The detection circuit 17 detects the mixed output from the mixing circuit 16. An output of the detection circuit 17 is input to the sample-and-hold circuit 18, and an output of the sample-and-hold circuit 18 is input to the low-frequency amplifier 19. The low-frequency amplifier 19 extracts, as a beat signal, a frequency component whose frequency is equal to the difference between the frequencies of the reception signal and the transmission signal, and eliminates an offset voltage. For example, the offset voltage elimination is to set the average value of the extracted beat signal voltage to 0. The offset voltage elimination is also called offset processing.

The microcomputer 21 has an A/D converter 22, a determining section 23, a high-frequency noise recognition section 24, and an AND circuit 25. The A/D converter 25 receives a signal from the low-frequency amplifier 19. The determining section 23 receives an A/D conversion output of the A/D converter 25 and judges whether or not a suspicious person has intruded.

During operation of the intrusion sensor 1, to reduce the power consumption, the microcomputer 21 sends a signal to the intermittent driving circuit 20 every prescribed time. Upon receiving a signal from the microcomputer 21, the intermittent driving circuit 20 drives the oscillation circuit 11 for a prescribed time.

A 4-MHz high-frequency signal that is output from the oscillation circuit 11 is frequency-multiplied and amplified by the frequency-multiplier/amplifier circuit 12 into a 24-GHz frequency signal, which is transmitted from the transmission antenna 13. Reflection waves that are produced by reflection, by a nearby object, of transmission radio waves emitted from the transmission antenna 13 are received by the reception antenna 14, and a resulting signal input to the receiving circuit 15. A reception signal from the receiving circuit 15 is mixed with the transmission signal from the frequency-multiplier/amplifier circuit 12 by the mixing circuit 16, and a resulting mixed signal is detected by the detection circuit 17.

A resulting detection signal is input to the low-frequency amplifier 19 via the sample-and-hold circuit 18. The low-frequency amplifier 19 detects, from the detection signal, as a beat signal, a frequency component whose frequency is equal to the difference between the frequencies of the reception signal and the transmission signal, and inputs the beat signal to the microcomputer 21. The microcomputer 21 extracts a waveform variation due to a movement of an object on the basis of data obtained by A/D-converting the output of the low-frequency amplifier 19, and detects whether or not an illegal intrusion into the vehicle has occurred.

More specifically, the determining section 23 performs judgment processing on the basis of the output of the A/D converter 22. For example, the determining section 23 performs intrusion judgment processing for judging presence/absence of a person by detecting a movement of a person. The high-frequency noise recognition section 24 judges whether or not high-frequency noise is included in the input signal by counting the number of peaks in the input signal waveform on the basis of the output of the A/D converter 22. When the count of the number of peaks in a prescribed time has become larger than a prescribed value, the high-frequency noise recognition section 24 outputs a high-level signal to the AND circuit 25 and thereby prohibits output of a judgment processing output of the determining section 23 to the security ECU 2.

Figure 2:
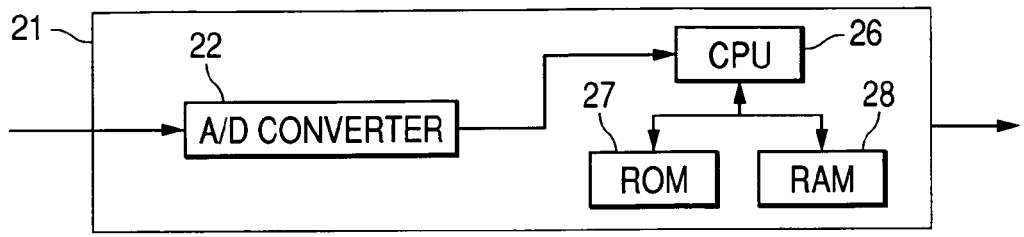
FIG. 2 shows a hardware configuration of a microcomputer.

FIG. 2 shows a hardware configuration for realizing the functions of the determining section 23, the high-frequency noise recognition section 24, and the AND circuit 25 of the microcomputer 21. The microcomputer 21 is composed of the A/D converter 22, a CPU 26, a ROM (read-only memory) 27, and a RAM (random access memory) 28.

The CPU 26 controls the individual hardware sections of the microcomputer 21, and runs various programs such as a noise recognition program and a judgment processing program according to programs stored in the ROM 27. The RAM 28, which is an SRAM, for example, stores temporal data that occur during execution of a program, such as sampling values of the A/D converter 22, peak values of an A/D conversion waveform, and peak judgment flags.

As described above, the determining section 23, the high-frequency noise recognition section 24, and the AND circuit 25 are formed by the CPU 26, the ROM 27, and the RAM 28 and the functions of the former are performed by software.

Next, the workings of the high-frequency noise recognition section 24 will be described with reference to a flowchart of FIG. 3 and a waveform diagram of FIG. 4.

Figure 3:
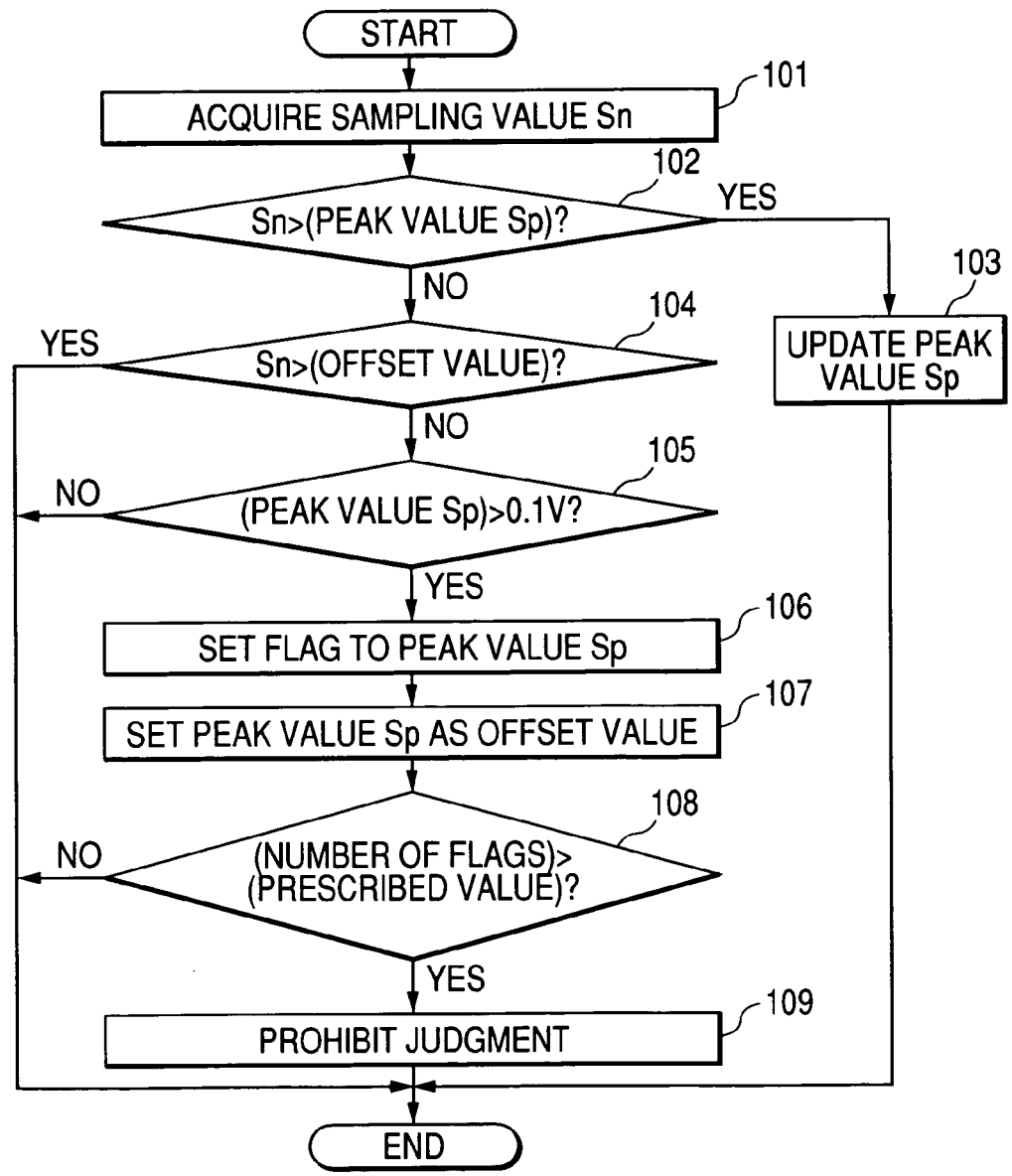
FIG. 3 is a flowchart showing the workings of a high-frequency noise recognition section.

When an A/D conversion output of the A/D converter 22 is input to the CPU 26 which serves as the high-frequency noise recognition section 24, the CPU 26 starts a high-frequency noise detection program shown as a flowchart in FIG. 3. First, at step 101, the CPU 26 acquires a sampling value Sn from the A/D converter 22 and stores it in the RAM 28. At step 102, the CPU 26 judges whether or not the sampling value Sn is larger than a peak value Sp stored in the RAM 28. If judging that the sampling value Sn is larger than the peak value Sp as in the case of a time point t1 in FIG. 4A, the CPU 26 replaces the peak value Sp stored in the RAM 28 with the sampling value Sn at step 103 and finishes the program.

On the other hand, if judging that the sampling value Sn is not larger than the peak value Sp, at step 104 the CPU 26 judges whether the sampling value Sn is larger than an offset value (0 V). If the sampling value Sn is larger than the offset value as in the case of a time point t2 in FIG. 4A, the CPU 26 finishes the program. If the sampling value Sn is not larger than the offset value as in the case of a time point t3 in FIG. 4A, at step 105 the CPU 26 judges whether or not the peak value Sp stored in the RAM 28 is larger than 0.1 V.

If judging at step 105 that the peak value Sp is not larger than 0.1 V, then the CPU 26 judges that the peak value Sp is of a peak caused by power supply noise or the like and finishes the program. If judging that the peak value Sp is larger than 0.1 V, at step 106 the CPU 26 sets a flag at a storage location of the RAM 28 where the sampling value Sn of the peak value Sp is stored. At step 107, the CPU 26 sets, as a new offset value, the peak value Sp stored in the RAM 28.

Figure 4A:
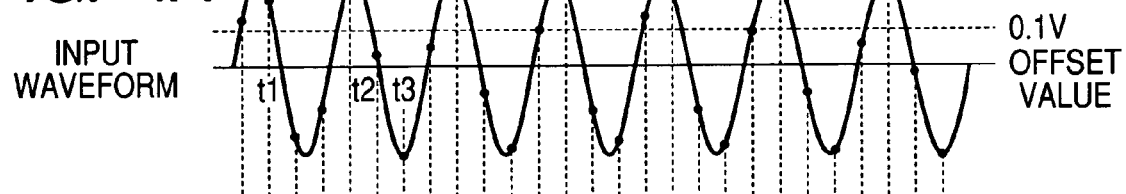
FIG. 4 shows waveforms occurring as the high-frequency noise recognition section operates.
Figure 4B:
Figure 4C:
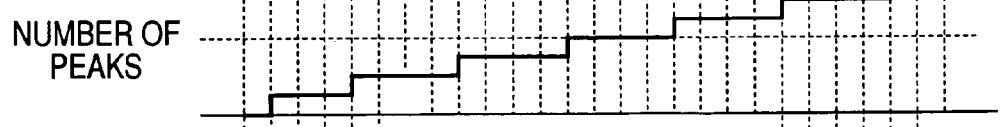
Figure 4D:
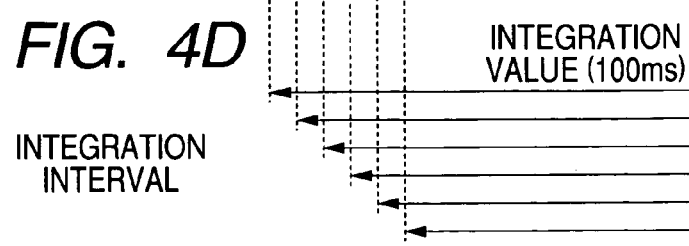

At step 108, the CPU 26 determines the number of flags that are attached to sampling values that have occurred from 100 ms before the current sampling timing to the current sampling timing as shown in FIG. 4D and judges whether or not the number of flags is larger than 4, for example. In this embodiment, integrating a variable (e.g., number of flags) within a predetermining interval (e.g., 100 ms) one end of which is the current sampling timing while the current sampling timing is changed with time subsequently (i.e., the interval is moved subsequently) is referred to as a moving interval integral. As a result of the moving interval integral, a plurality of integration values (i.e., each sum of the numbers of flags within each predetermined interval) are obtained with being associated with the respective sampling timings.

If judging that the number of flags is not larger than 4, then the CPU 26 judges that high-frequency noise is not included and finishes the program. If judging that the number of flags is larger than 4, at step 109 the CPU 26 judges that high-frequency is included and prohibits a judgment processing of the determining section 23.

As described above, since the CPU 26 judges whether or not a high-frequency component is included by counting the number of peaks in the prescribed time, the CPU 26 can detect high-frequency noise without the need for increasing the sampling frequency of the A/D converter. Therefore, even a low-price microcomputer can perform data processing successfully without being influenced by high-frequency noise.

The CPU 26 judges that a peak is present only if the peak value is larger than 0.1 V. This makes it possible to prevent an erroneous operation due to a faint waveform variation such as power supply noise or a noise signal in the sensor.

Further, since the CPU 26 detects the number of peaks of a waveform only on the peak side of the waveform, the processing load of the microcomputer (i.e., CPU 26) can be reduced.

Although in the above embodiment the CPU 26 detects the number of peaks of a waveform only on the peak side of the waveform, the CPU 26 may detect the number of peaks of a waveform on the bottom side of the waveform. Further, in the above embodiment, the offset value is set at 0 V, the value used for judging that a peak is present is set at 0.1 V, and the number of peaks that is used for judging that noise is included is set at 4. However, these values may be set at arbitrary values.

Second Embodiment

Next, an embodiment of an intrusion sensor in which a judgment processing is prohibited when a signal having a constant period and steep rising edges is received will be described with reference to a block diagram of FIG. 5.

A microcomputer 21 of this intrusion sensor 1 is composed of an A/D converter 22 for A/D-converting an input signal, a determining section 23 to which an A/D conversion output of the A/D converter 22 is input, a constant period noise recognition section 29, and an AND circuit 25. The other part of the configuration is the same as that of the intrusion sensor 1 of FIG. 1 and hence will not be described in detail.

As in the above, the determining section 23 performs judgment processing on the basis of an output of the A/D converter 22. The constant period noise recognition section 29 judges whether or not a signal having a constant period and steep rising edges is included in the input signal by using sampling values acquired by the A/D converter 22 in a prescribed time. If a signal having a constant period and steep rising edges is included, the constant period noise recognition section 29 prohibits a judgment processing of the determining section 23.

As in the first embodiment, the determining section 23, the constant period noise recognition section 29, and the AND circuit 25 are formed by a CPU 26, a ROM 27, and a RAM 28 (see FIG. 2) and the functions of the former are performed by software.

Figure 17:
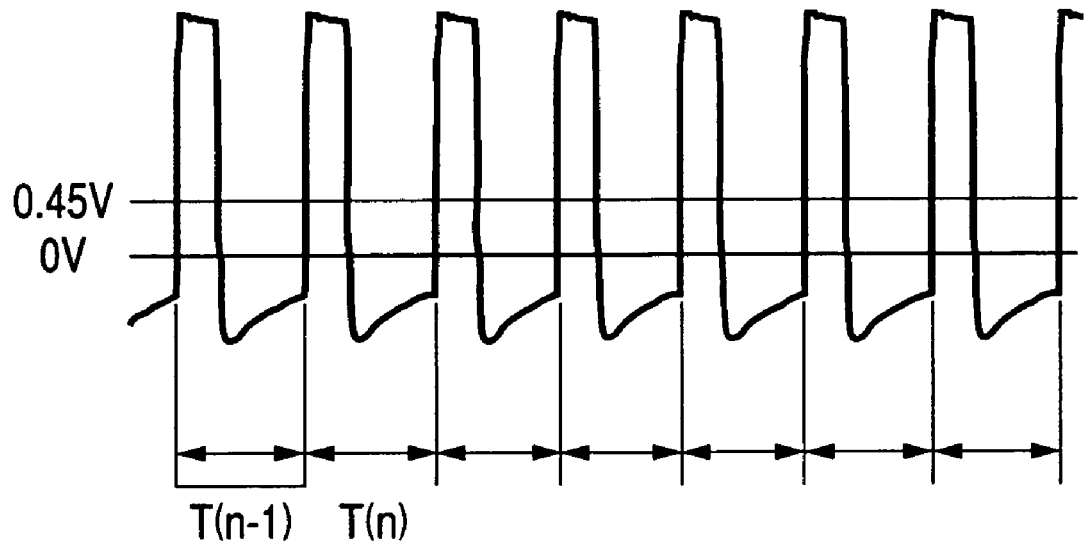
FIG. 17 shows the waveform of an exemplary signal having a constant period and steep rising edges.

Next, the workings of the constant period noise recognition section 29 will be described with reference to the hardware configuration diagram of FIG. 2, a flowchart of FIG. 6 and waveform diagrams of FIG. 7 and FIG. 17.

Figure 6:
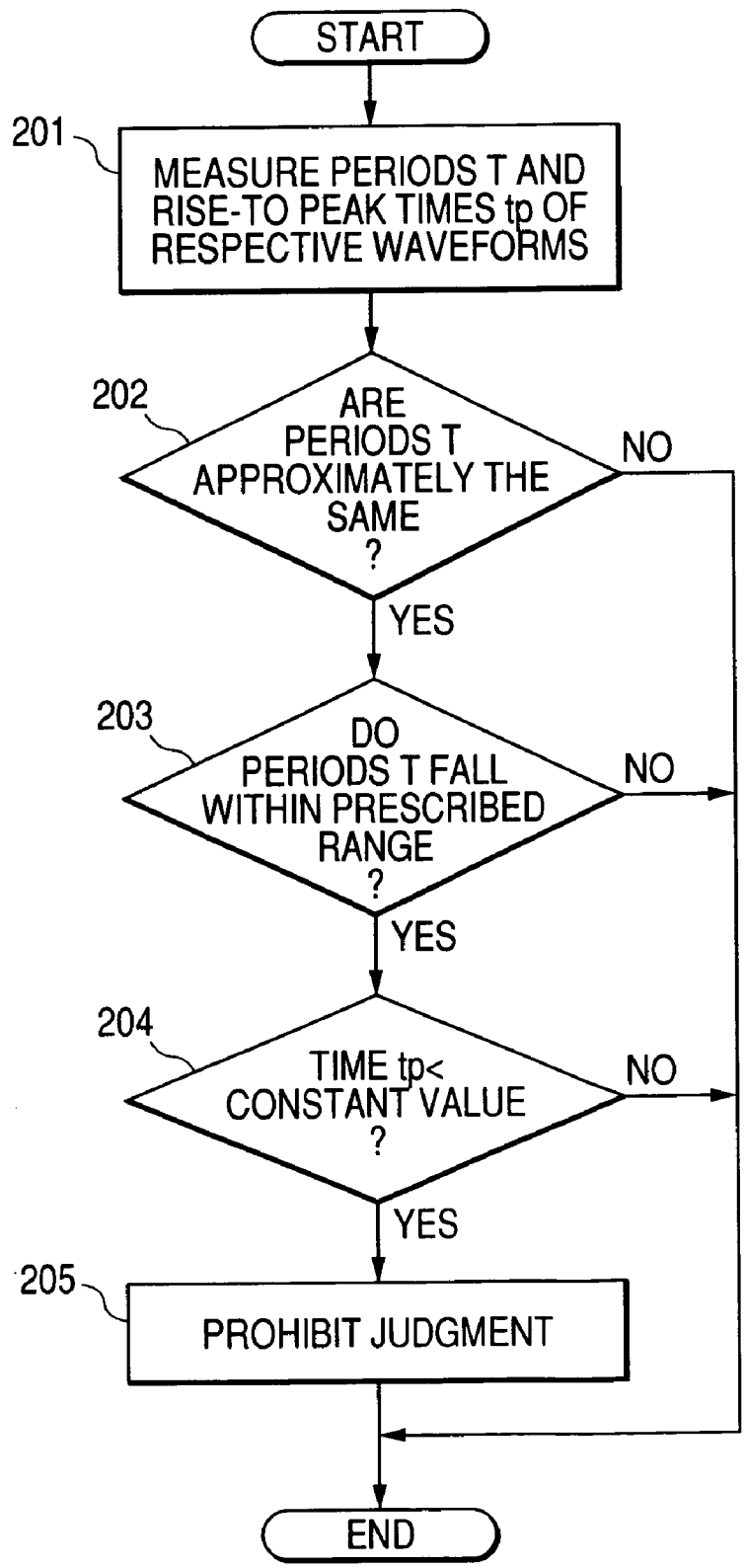
FIG. 6 is a flowchart showing the workings of a constant period noise recognition section.
Figure 7A:
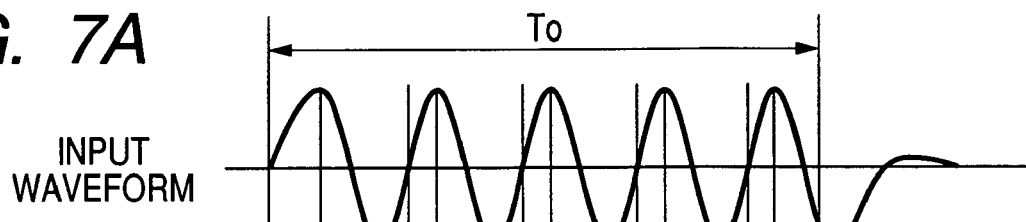
FIG. 7 shows waveforms occurring as the constant period noise recognition section operates.
Figure 7B:
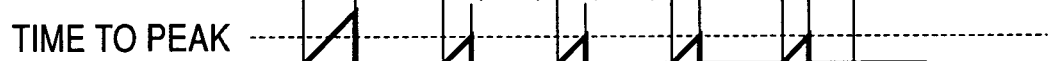

The CPU 26 which serves as the constant period noise recognition section 29 always operates so as to store an A/D conversion output of the A/D converter 22, and runs a constant period noise detection program shown in FIG. 6 every prescribed time. Upon starting this program, at step 201, using sampling values acquired in a past prescribed period To, the CPU 26 calculates periods Tn, T(n+1), T(n+2), . . . of respective waveforms as shown in FIG. 7A and calculates rise-to-peak times tp1, tp2, tp3, . . . of the respective partial waveforms as shown in FIG. 7B.

At step 202, the CPU 26 judges whether or not the calculated periods Tn, T(n+1), T(n+2), . . . are approximately the same. If judging that the periods T are not approximately the same, the CPU 26 finishes the program. For example, the judgment as to whether the periods T are not approximately the same is made by judging whether or not all of period differences Tn−T(n+1) etc. are smaller than a certain reference value. If a large period difference is found for a prescribed number of peaks, it can be judged that the periods T are not approximately the same.

Figure 7C:
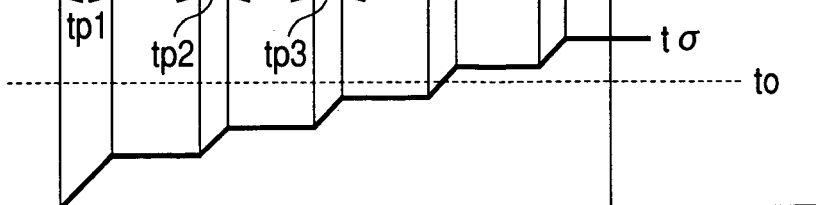

On the other hand, if judging that the periods T are approximately the same, at step 203 the CPU 26 judges whether or not the periods T fall within a prescribed range. If judging that the periods T do not fall within the prescribed range, then the CPU 26 finishes the program. If judging that the periods T fall within the prescribed range, at step 204 the CPU 26 calculates an integration value tσ of rise-to-peak times tp of a prescribed number of (e.g., five) waveforms in the period To as shown in FIG. 7C and judges whether or not the integration value tσ is smaller than a set value to.

If judging that the integration value tσ is not smaller than the set value to, the CPU 26 finishes the program. If judging that the integration value tσ is smaller than the set value to, at step 205 the CPU 26 prohibits a judgment processing of the determining section 23 because the CPU 26 judges that a signal having steep rising edges as shown in FIG. 17 is being input and hence an erroneous judgment may occur.

As described above, the CPU 26 can detect a signal having a constant period and steep rising edges by determining periods and rise times of a waveform. Therefore, if a signal having a constant period and steep rising edges exists, the data processing can be prohibited without the need for increasing the sampling frequency of the A/D converter.

If periods are approximately the same and fall within the prescribed range, the CPU 26 judges that a signal having a constant period and steep rising edges exists. Therefore, the CPU 26 can extract only a signal whose period is likely to occur in general.

It is preferable that the CPU 26 run the above constant period noise detection program when the amplitude of an input signal is larger than a prescribed value. In this case, refraining from using a period(s) and a rise time(s) of first one or several waveforms makes it possible to detect noise only after the waveform has become stable.

Further, even a waveform having a different frequency can be subjected to a judgment as to whether or not it continues stably by employing a period judgment method that a first waveform is used as a reference value and whether or not periods of subsequent waveforms fall within a range of (reference value) ±allowance is detected.

Third Embodiment

In the above embodiments, whether or not noise is included in a sensor signal is judged in the microcomputer 21. Alternatively, a judgment processing of the determining circuit may be prohibited by detecting high-frequency noise with a high-pass filter which detects a high-frequency signal. An embodiment in which high-frequency noise is detected by a high-pass filter will be described below with reference to a block diagram of FIG. 8.

A microcomputer 21 of an intrusion sensor 1 is composed of an A/D converter 22 for A/D-converting an input signal, a determining section 23 to which an A/D conversion output of the A/D converter 22 is input, and an AND circuit 25. Further, a high-pass filter (HPF) 30 to which an output of the low-frequency amplifier 19 is input and a comparator 31 are provided in addition to the configuration of FIG. 1. The other part of the configuration is the same as that of the intrusion sensor 1 of FIG. 1 and hence will not be described in detail.

As in the above, the determining section 23 performs judgment processing for judging presence/absence of a suspicious person on the basis of an output of the A/D converter 22. The high-pass filter 30 detects high-frequency noise that may exist in an output of the low-frequency amplifier 19. If the peak-to-peak value of the output of the high-pass filter 30 exceeds a prescribed amplitude, the comparator 31 outputs a high-level signal to the AND circuit 25, as a result of which the output of a judgment processing result of the determining section 23 is prohibited.

Accordingly, a prohibition judgment can be made by hardware by recognizing noise with the high-pass filter 30. As a result, the load of the microcomputer can be reduced and hence cost increase of the microcomputer can be suppressed.

Fourth Embodiment

Whereas in the above embodiments noise is detected on the intrusion sensor side, noise may be detected on the main, ECU side. An embodiment in which noise is detected on the security ECU side will be described below with reference to a block diagram of FIG. 9.

A security ECU 2 of this security system is equipped with a high-frequency noise recognition section 24 and an AND circuit 25. A microcomputer 21 of an intrusion sensor 1 is composed of an A/D converter 22 for A/D-converting an input signal and a determining section 23 to which an A/D conversion output of the A/D converter 22 is input. The other part of the configuration is the same as that of the intrusion sensor 1 of FIG. 1 and hence will not be described in detail.

As in the embodiment of FIG. 1, the determining section 23 of the microcomputer 1, to which an output of the A/D converter 22 is input, performs judgment processing for judging presence/absence of an intruder. The high-frequency noise recognition section 24 of the security ECU 2 detects high-frequency noise. If the output of the high-frequency noise recognition section 24 is of the high level, the AND circuit 25 prohibits output of a judgment result of the determining section 23 of the microcomputer 1 to the horn 3.

Detecting noise on the security ECU 2 side in the above-described manner can make the load of the microcomputer lighter than in the case of performing prohibition processing on the intrusion sensor 1 side.

Figure 5:
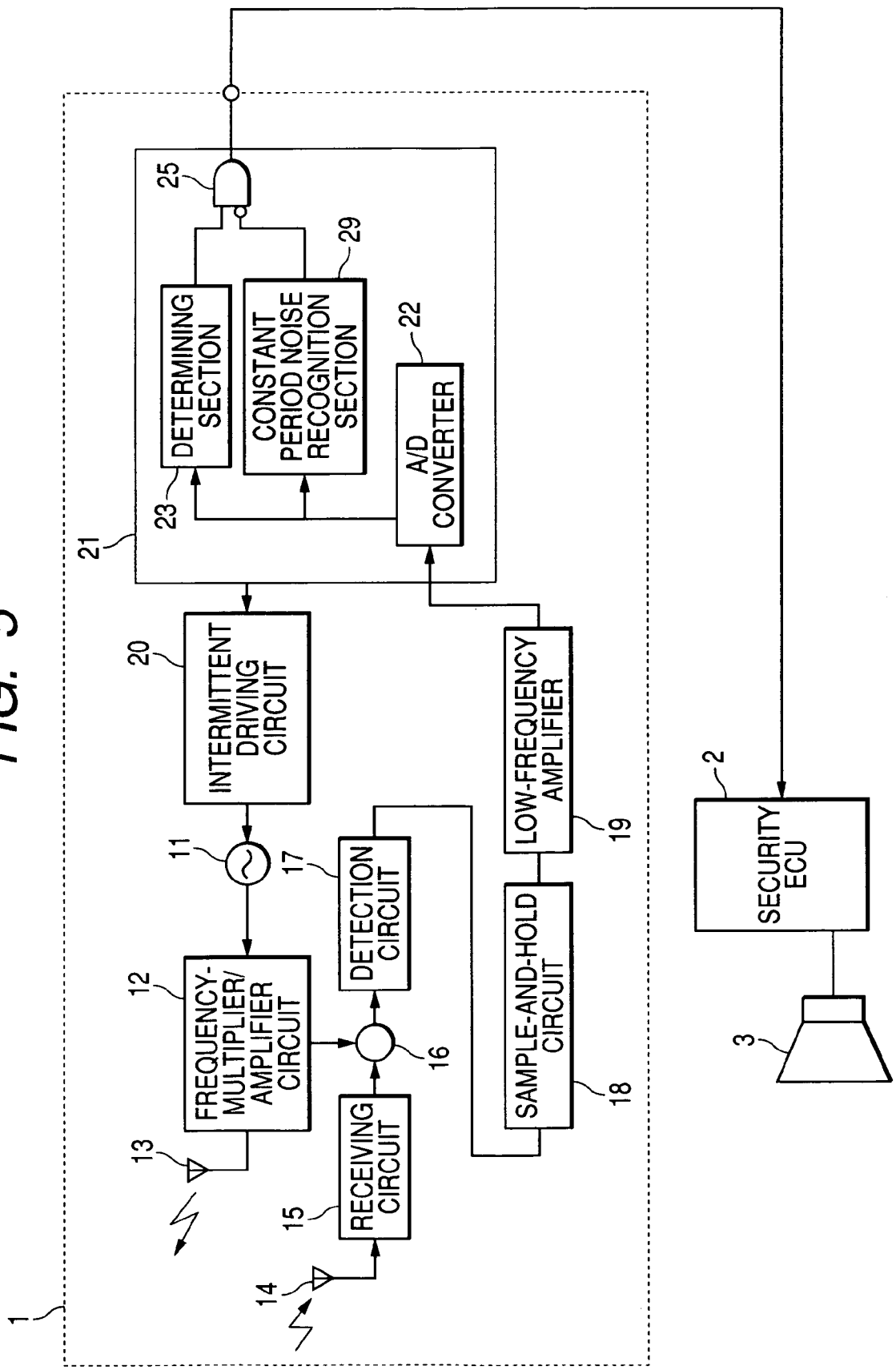
FIG. 5 is a block diagram showing the configuration of an intrusion sensor, which prohibits a judgment processing when a signal having a constant period and steep rising edges is input.
Figure 8:
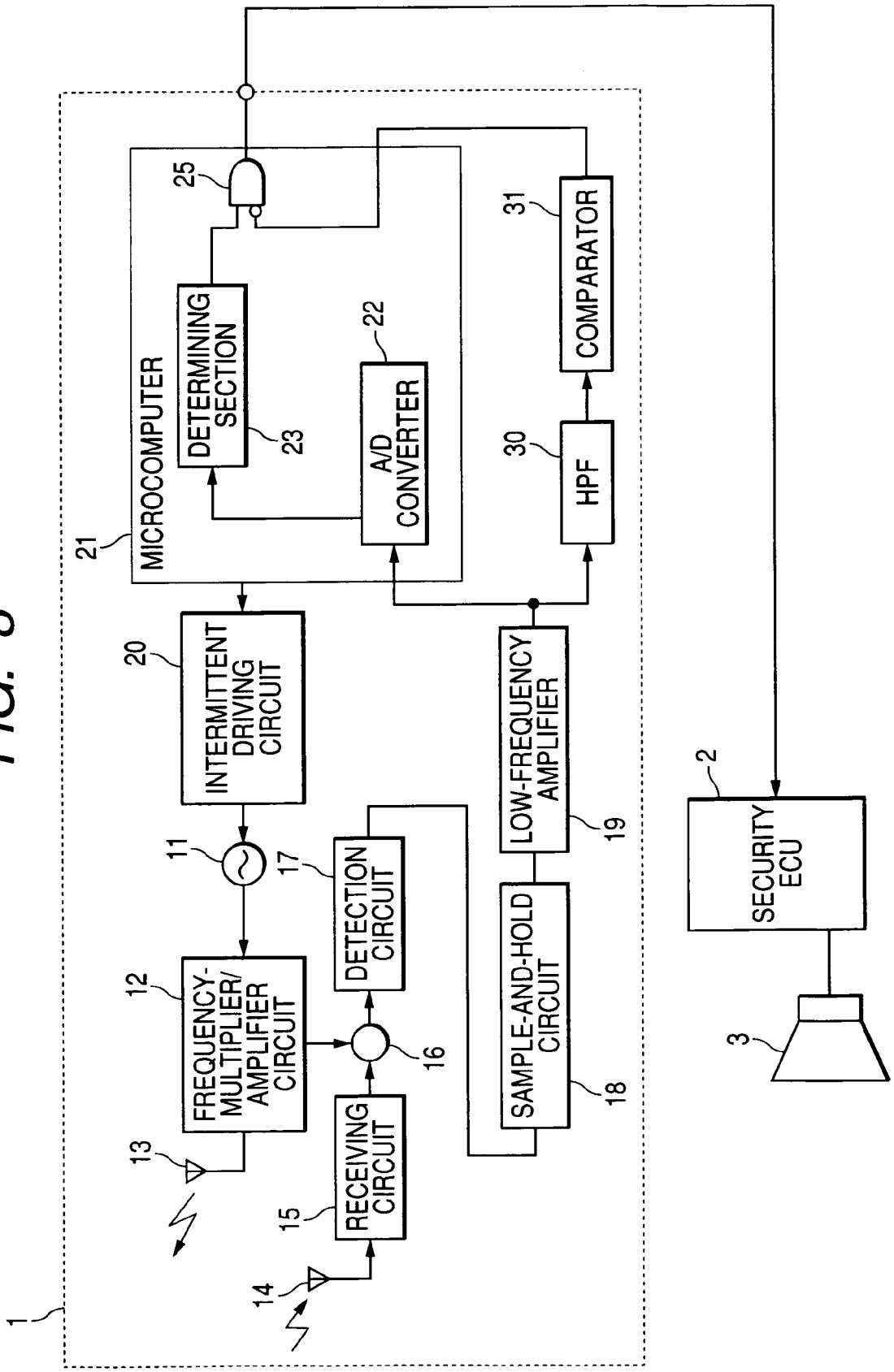
FIG. 8 is a block diagram showing the configuration of an intrusion sensor, which prohibits a judgment processing by recognizing noise with a high-pass filter.

Although in this embodiment noise is detected by the high-frequency noise recognition section 24 that is the same as shown in FIG. 1, the constant period noise recognition section 29 according to the embodiment of FIG. 5 or the noise recognition section according to the embodiment of FIG. 8 which is composed of the high-pass filter 30 and the comparator 31 may be used instead.

Fifth Embodiment

In the above embodiments, whether or not noise has occurred is judged all the time. However, another configuration is possible in which the microcomputer performs prohibition judgment processing only in a prescribed period starting from the beginning of a waveform and a prohibition judgment result produced in response to noise detection and a judgment result of the determining section are ANDed after the former is made a definite one. An embodiment in which the microcomputer performs prohibition judgment processing only in a prescribed period starting from the beginning of a waveform will be described below with reference to a flowchart of FIG. 10 and a waveform diagram of FIG. 11.

The apparatus configurations are the same as shown in FIGS. 1 and 2 and hence will not be described in detail.

Figure 10:
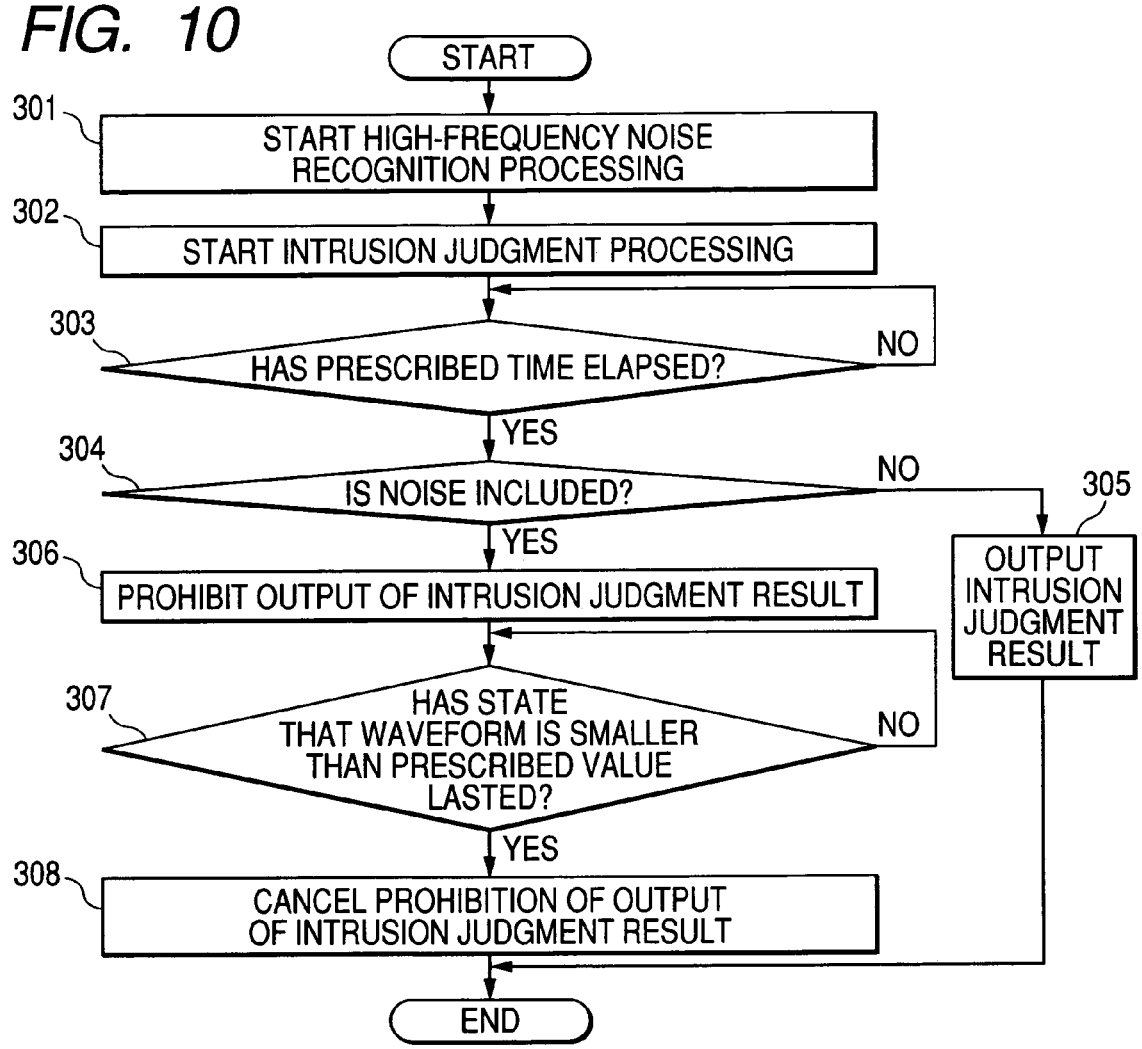
FIG. 10 is a flowchart showing workings of a case that the microcomputer performs prohibition judgment processing only in a prescribed period starting from the beginning of a waveform.
Figure 11:
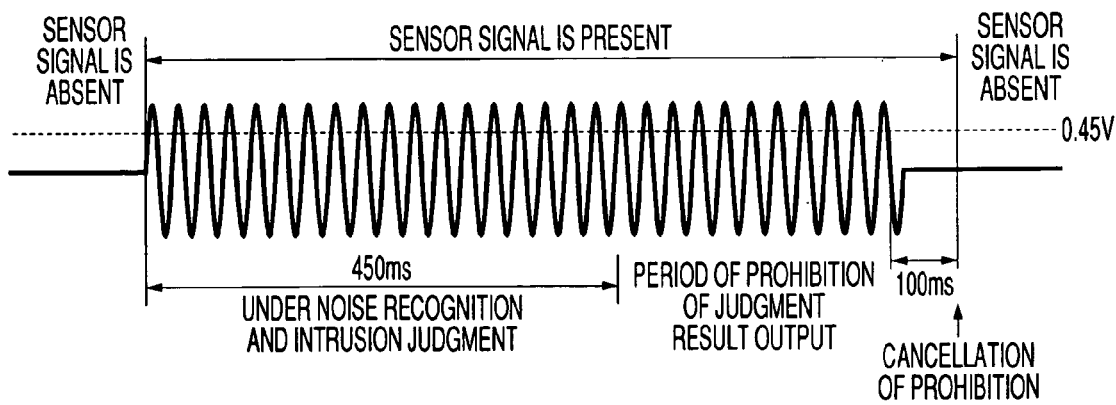
FIG. 11 is a waveform diagram of the case that the microcomputer performs prohibition judgment processing only in a prescribed period starting from the beginning of a waveform.

When the low-frequency amplifier 19 generates a sensor signal as shown in FIG. 11 due to an intrusion of a suspicious person or occurrence of noise, the CPU 26 starts a judgment program shown in the flowchart of FIG. 10. First, the high-frequency noise recognition section 24 starts to perform high-frequency noise recognition processing on the basis of an output of the A/D converter 22 at step 301 and the determining section 23 starts intrusion judgment processing at step 302.

At step 303, the CPU 26 judges, using a timer (not shown), whether or not a prescribed time (e.g., 450 ms) has elapsed. If the prescribed time has elapsed, at step 304 the CPU 26 judges whether or not noise is included on the basis of an output of the high-frequency noise recognition section 24. If noise is not included, at step 305 an intrusion judgment result of the determining section 23 is output to the security ECU 2.

On the other hand, if judging at step 304 that noise is included in the sensor signal, the CPU 26 prohibits output of an intrusion judgment result at step 306 and judges at step 307 whether or not a state that the amplitude of the waveform of the sensor signal is smaller than a prescribed value has lasted for a prescribed time. If a state that the amplitude of the sensor signal is smaller than 0.45 V, for example, has lasted for more than 100 ms as shown in FIG. 11, at step 308 the CPU 26 changes the level of the output of the high-frequency noise recognition section 24 to the low level and thereby cancels the prohibition of output of an intrusion judgment result to the security ECU 2.

As described above, noise recognition processing is performed in the prescribed period starting from the beginning of a wave form and a judgment result is output only after completion of the noise recognition processing unless its output is prohibited. This makes it possible to prevent an erroneous judgment which may occur until a prohibition judgment result is made a definite one. Further, a prohibition state is canceled if a state that the output of an intrusion judgment result is prohibited and an input signal is smaller than the prescribed value has lasted for the prescribed time. Therefore, when the prescribed condition is satisfied, a prohibition state can be canceled and the normal function can be restored.

In this embodiment, prohibition judgment processing of the microcomputer as performed in the security system of FIG. 1 is performed only in the prescribed period starting from the beginning of a waveform. Alternatively, prohibition judgment processing as performed in the security system of FIG. 5, 8, or 9 may be performed only in a prescribed period starting from the beginning of a waveform.

Sixth Embodiment

Noise detection using an unstable noise waveform occurring immediately after a start of noise may be prevented by prohibiting noise recognition processing and intrusion judgment processing in a prescribed period starting from the beginning of a waveform. An embodiment in which noise recognition processing and intrusion judgment processing are prohibited in a prescribed period starting from the beginning of a waveform will be described below with reference to a flowchart of FIG. 12 and a waveform diagram of FIG. 13.

The apparatus configurations are the same as shown in FIGS. 1 and 2 and hence will not be described in detail.

Figure 12:
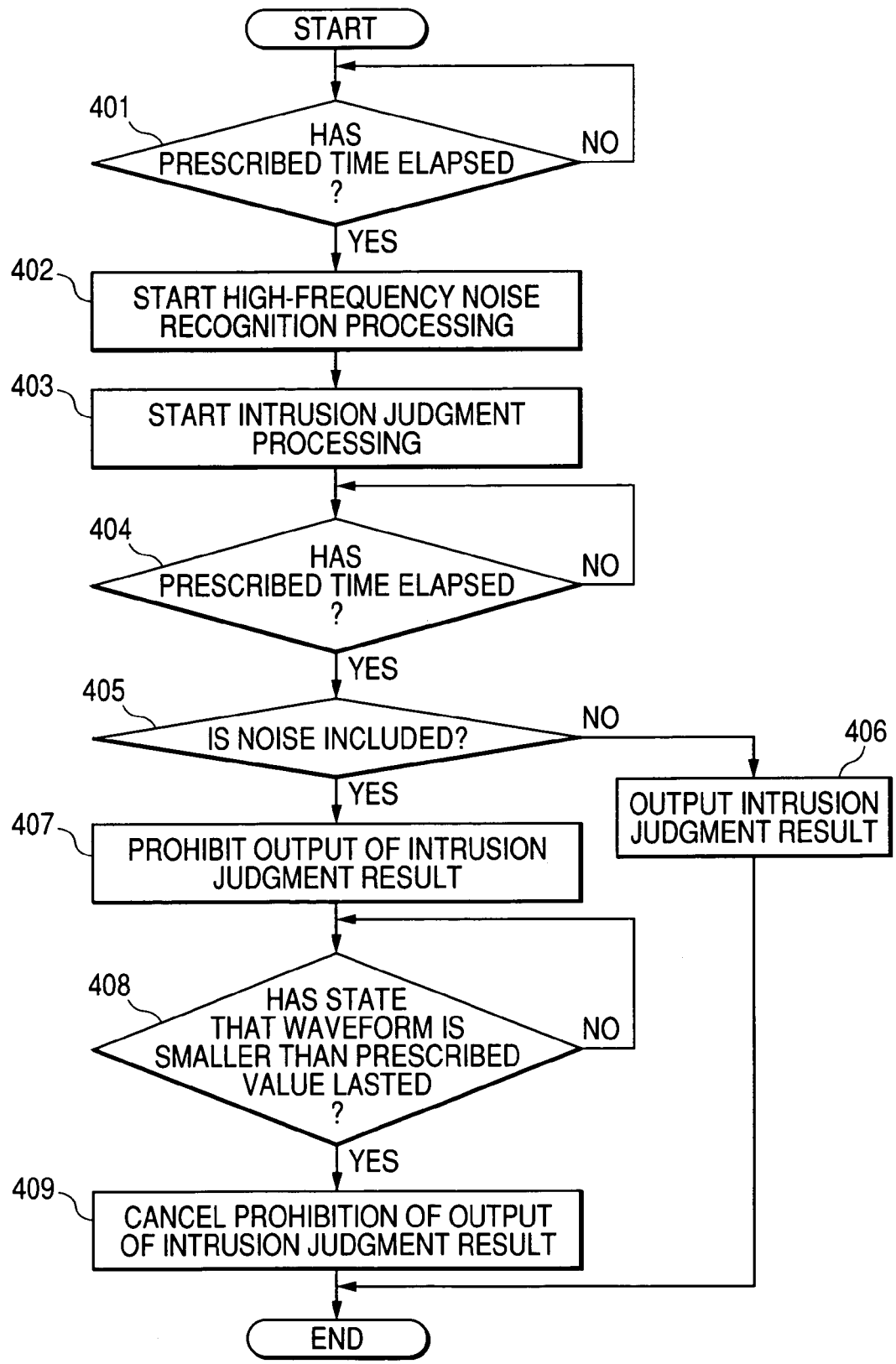
FIG. 12 is a flowchart showing workings of a case that noise recognition processing and intrusion judgment processing are prohibited in a prescribed period starting from the beginning of a waveform.
Figure 13:
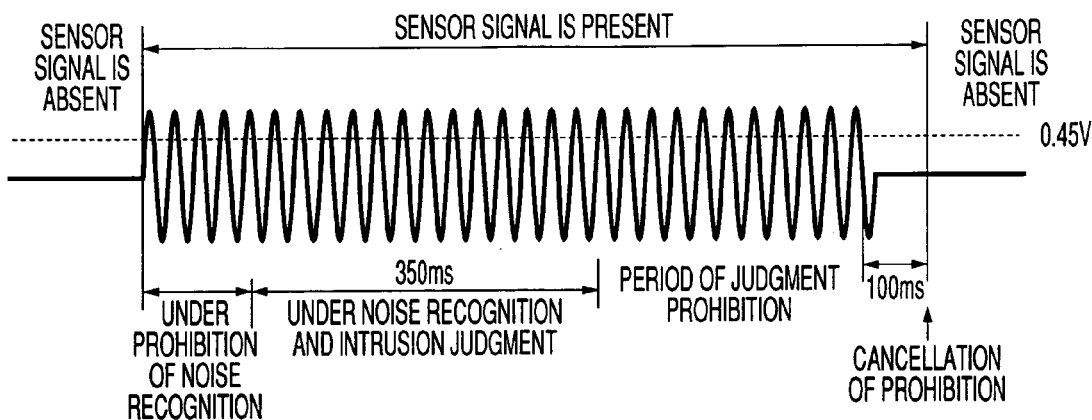
FIG. 13 is a waveform diagram of the case that noise recognition processing and intrusion judgment processing are prohibited in a prescribed period starting from the beginning of a waveform.

When the low-frequency amplifier 19 generates a sensor signal as shown in FIG. 13 due to an intrusion of a suspicious person or occurrence of noise, the CPU 26 starts a judgment program shown in the flowchart of FIG. 12. First, at step 401, the CPU 26 judges, using a timer, whether or not a prescribed time has elapsed. If 100 ms, for example, has elapsed from the beginning of a sensor signal, the high-frequency noise recognition section 24 starts to perform high-frequency noise recognition processing on the basis of an output of the A/D converter 22 at step 402 and the determining section 23 starts intrusion judgment processing at step 403.

At step 404, the CPU 26 judges, using a timer, whether or not a prescribed time has elapsed further. If 350 ms, for example, has elapsed, at step 405 the CPU 26 judges whether or not the sensor signal includes noise on the basis of an output of the high-frequency noise recognition section 24. If noise is not included, at step 406 an intrusion judgment result of the determining section 23 is output to the security ECU 2.

On the other hand, if judging at step 405 that the sensor signal includes noise, the CPU 26 prohibits output of an intrusion judgment result at step 407 and judges at step 408 whether or not a state that the amplitude of the waveform of the sensor signal is smaller than a prescribed value has lasted for a prescribed time. If a state that the amplitude of the sensor signal is smaller than 0.45 V, for example, has lasted for more than 100 ms as shown in FIG. 13, at step 409 the CPU 26 changes the level of the output of the high-frequency noise recognition section 24 to the low level and thereby cancels the prohibition of output of an intrusion judgment result to the security ECU 2.

As described above, noise recognition processing is prohibited in the prescribed period starting from the beginning of a waveform and a judgment processing using an unstable initial waveform is prohibited. This makes it possible to prevent erroneous detection in each of the prohibition judgment processing and the intrusion judgment processing.

Figure 9:
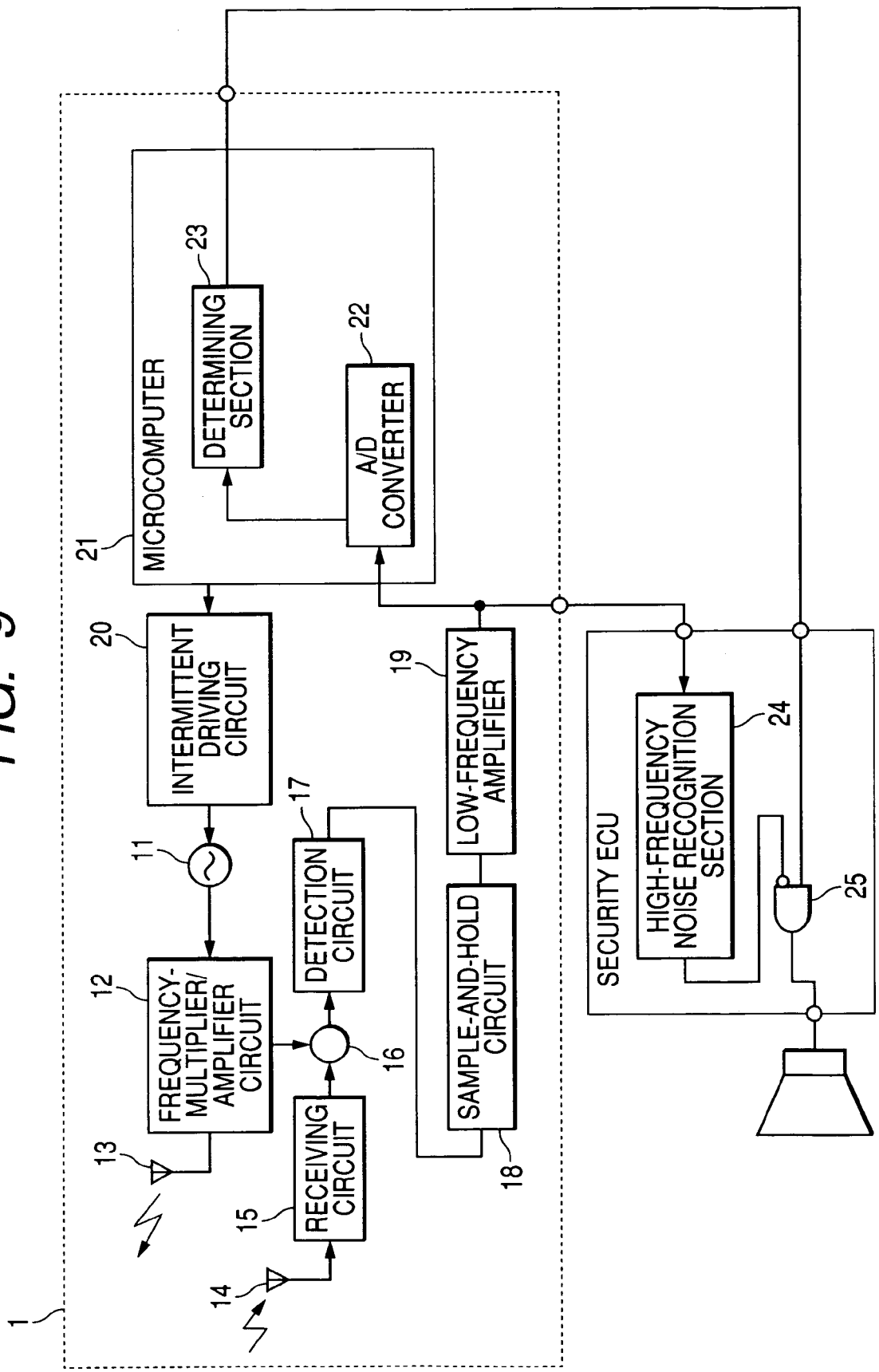
FIG. 9 is a block diagram showing the configuration of a security system in which noise is recognized by a security ECU.

In this embodiment, noise recognition processing and intrusion judgment processing may be prohibited in a prescribed period starting from the beginning of a waveform in the security system of FIG. 5, 8, or 9 instead of the security system of FIG. 1.

Seventh Embodiment

The manner of occurrence of noise varies depending on the noise source such as a cell phone or a microwave oven. Therefore, another configuration is possible in which prohibition conditions are set for plural respective noise sources and output of a judgment result is prohibited by ORing the respective prohibition conditions. An embodiment in which different prohibition cancellation conditions are set for respective noise sources will be described with reference to a waveform diagram of FIG. 14.

Figure 14A:
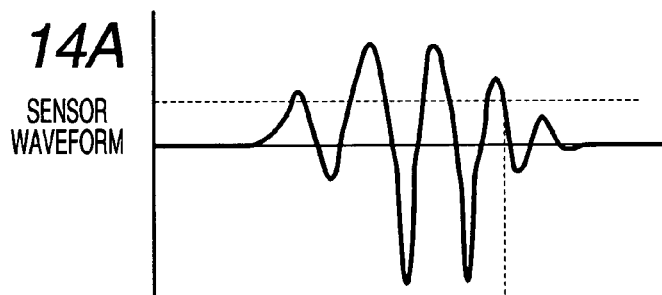
FIG. 14 is waveform diagrams showing workings of a case that different prohibition cancellation conditions are set for respective noise sources.
Figure 14B:
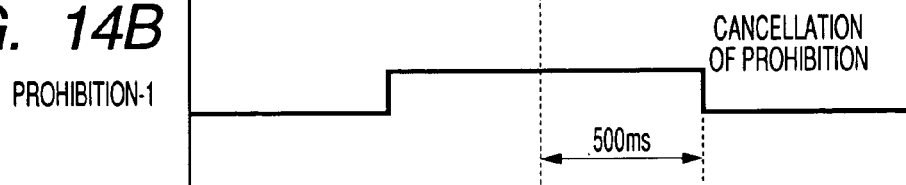
Figure 14C:
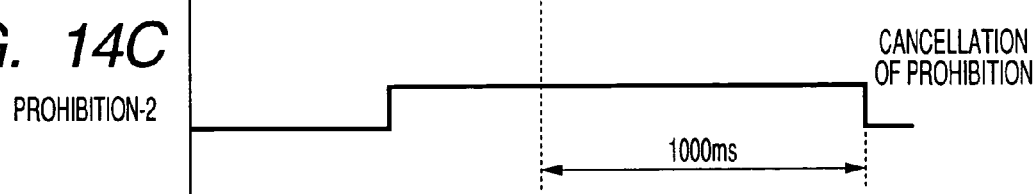
Figure 14D:
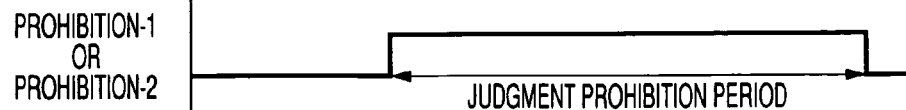
Figure 15:
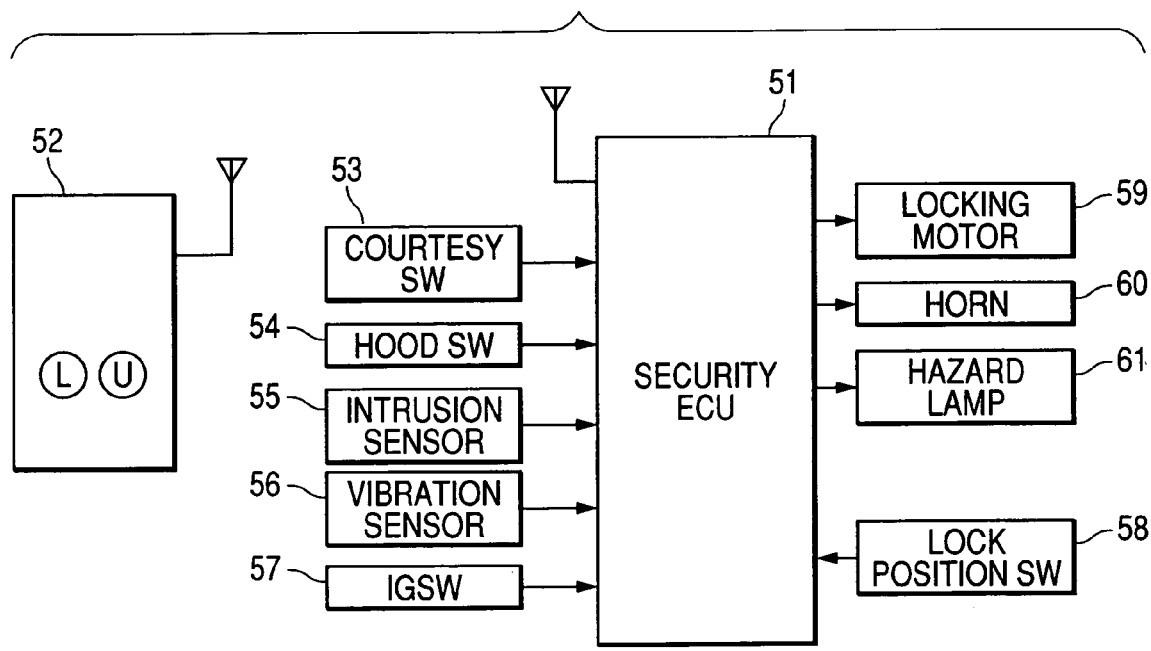
FIG. 15 is a block diagram showing a configuration of a security system according to a related art.
Figure 16:
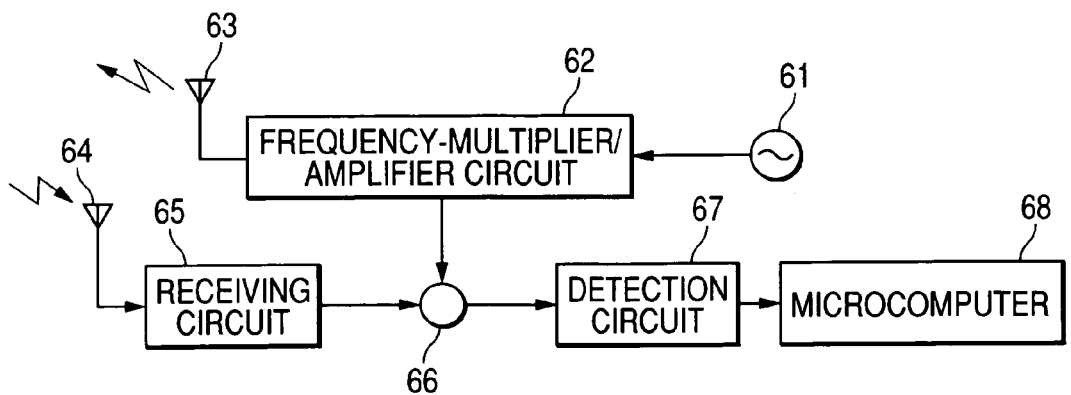
FIG. 16 is a block diagram showing a configuration of an intrusion sensor according to a related art.

Assume that as for "prohibition-1" and "prohibition-2" a period during which to judge continuation of a state that the amplitude of a waveform is smaller than a prescribed value is set at 500 ms and 1,000 ms as shown in FIGS. 14B and 14C, respectively. Where, for example, two kinds of processing corresponding to "prohibition-1" and "prohibition-2" are implemented by switches etc., the both are ORed and hence a period during which to judge continuation of a state that the amplitude of a waveform is smaller than the prescribed value is set at 1,000 ms as shown in FIG. 14D. The period of detection prohibition is thus elongated.

As described above, where plural data-processing prohibition conditions, which are different in condition, are provided and the both conditions are set up, an erroneous operation due to different noise sources can be prevented by prohibiting a data processing by ORing processing the respective prohibition conditions.

Eighth Embodiment

Figure 18:
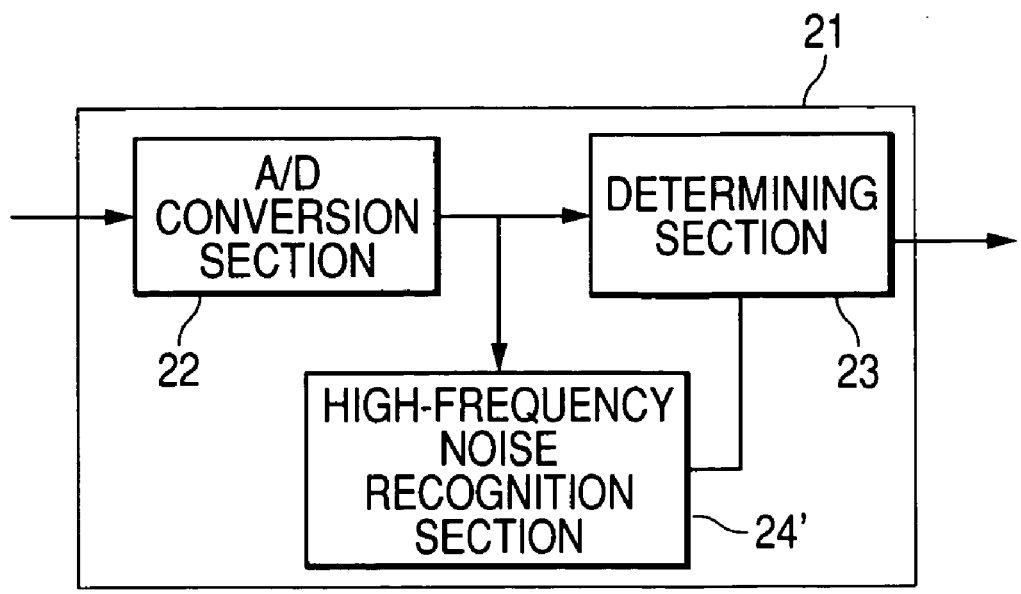
FIG. 18 is a block diagram showing a configuration of a microcomputer 21 according to an eighth embodiment of the invention.

FIG. 18 is a block diagram showing the configuration of a microcomputer 21 according to an eighth embodiment which is a modification of the first embodiment. The configuration of an intrusion sensor 1 excluding the microcomputer 21 is the same as in the first embodiment (FIG. 1) and hence will not be described below.

The microcomputer 21 operates as a data processing apparatus and is equipped with an A/D converter 22, a determining section 23, and a high-frequency noise recognition section 24'. An input signal (offset-processed beat signal) is input from the low-frequency amplifier 19 (see FIG. 1) to the A/D converter 22. The A/D converter 22 A/D-converts the input signal and outputs an A/D conversion output to the determining section 23 and the high-frequency noise recognition section 24'. The determining section 23 performs a judgment process, for example, intrusion judgment processing for judging presence/absence of a person by detecting his or her movement, on the basis of an output of the A/D converter 22. The high-frequency noise recognition section 24' counts the number of peaks of the input signal waveform on the basis of the output of the A/D converter 22, and judges whether or not the number of peaks counted in a prescribed time is larger than a prescribed value. In other words, the operation of the high-frequency noise recognition section 24' is approximately the same as the operation of the high-frequency noise recognition section 24 of the first embodiment except for the following point. That is, if judging that the number of peaks counted in the prescribed time is larger than the prescribed value, the high-frequency noise recognition section 24' prohibits the determining section 23 from performing intrusion judgment processing.

In the first and eighth embodiments, it can be said that the high-frequency noise recognition section 24 or 24' "disables" intrusion judgment processing of the determining section 23 if the number of peaks counted in the prescribed time is larger than the prescribed value. In this specification, the term "disables data processing" at least includes prohibiting data processing, prohibiting output of a result of data processing to the outside of the data processing apparatus, and disregarding a result of data processing.

The microcomputer 21 (A/D converter 22, determining section 23, and constant period noise recognition section 29) according to the second embodiment (FIG. 5) may also be modified so as to have the same configuration as shown in FIG. 18. That is, the constant period noise recognition section 29 may prohibit the determining section 23 from performing intrusion judgment processing if judging that a signal having a constant period and steep rising edges is included. It goes without saying that the microcomputer 21 according to the third embodiment (FIG. 9) may also be modified likewise.

In the above description, the data processing apparatus of each embodiment may be applied to an intrusion sensor or a security system.

For example, an intrusion sensor for detecting if an unauthorized person enters into a monitoring area may include a transmitting unit, a receiving unit, a circuit, and a microcomputer according to any of the embodiments described above. The transmitting unit transmits a transmission signal to the monitoring area. The receiving unit receives a reception signal, which is the transmission signal reflected in the monitoring area. The transmission signal and the reception signal are input into the circuit. The circuit extracts a beat signal between the transmission signal and the reception signal. The microcomputer includes a data processing apparatus of each embodiment and an A/D converter that A/D converts the beat signal input from the circuit.

Also, an antitheft apparatus may include an electronic control unit and the intrusion sensor described above. When a result of the data processing executed by the intrusion sensor indicates that the unauthorized person is present in the monitoring area, the electronic control unit gives an alarm. Furthermore, the data processing apparatus of each embodiment may be applied to data processing apparatuses for executing various waveform recognition processing.

While a number of exemplary aspect and embodiments have been discussed above, those of skill in the art will recognize certain modifications, permutations, additions and sub-combinations thereof. It is therefore intended that the following appended claims and claims hereinafter introduced are interpreted to include all such modifications, permutations, additions and sub-combinations as are within the true spirit and scope.

What is claimed is:

1. A data processing apparatus for executing data processing with respect to an output of A/D conversion of an input signal, the data processing apparatus comprising:
   a high-frequency noise recognition unit that detects number of peaks of waveforms of the input signal on a basis of the output of the A/D conversion, the high-frequency noise recognition unit that determines whether or not the number of the peaks, which has been detected within a predetermined time, is equal to or larger than a predetermined value.

2. The data processing apparatus according to claim 1, wherein when the high-frequency noise recognition unit determines that the number of the peaks, which has been detected within the predetermined time, is equal to or larger than the predetermined value, the data processing is disabled.

3. The data processing apparatus according to claim 2, further comprising:
   a determining section that executes the data processing with respect the output of the A/D conversion of the input signal, wherein:
   when the high-frequency noise recognition unit determines that the number of the peaks, which has been detected within the predetermined time, is equal to or larger than the predetermined value, the high-frequency noise recognition unit disables the data processing executed by the determining section.

4. The data processing apparatus according to claim 2, wherein the high-frequency noise recognition unit performs moving interval integral to detect the number of the peaks within the predetermined time.

5. The data processing apparatus according to claim 2, wherein the high-frequency noise recognition unit detects the number of the peaks using the peaks or bottoms of waveforms, which are undergone offset processing.

6. The data processing apparatus according to claim 1, further comprising:
   a determining section that executes the data processing with respect the output of the A/D conversion of the input signal; and
   a prohibiting section that prohibits an output of the determining section from being output to an outside of the data processing apparatus, when the high-frequency noise recognition unit determines that the number of the peaks, which has been detected within the predetermined time, is equal to or larger than the predetermined value.

7. The data processing apparatus according to claim 1, wherein the high-frequency noise recognition unit detects the number of the peaks of the waveforms of the input signal on a basis of the output of the A/D conversion, using an nth waveform of the input signal and subsequent waveforms of the input signal where n is a natural number.

8. The data processing apparatus according to claim 1, wherein when an amplitude of each waveform is equal to or larger than another predetermined value, the high-frequency noise recognition unit determines whether or not the number of the peaks, which has been detected within the predetermined time, is equal to or larger than the predetermined value.

9. The data processing apparatus according to claim 1, wherein:
   the high-frequency noise recognition unit detects the number of the peaks of the waveforms of the input signal for another predetermined time beginning at occurrence of the waveforms, and
   after the high-frequency noise recognition unit has determined that the number of the peaks, which has been detected within the predetermined time, is less than the predetermined value, the data processing is enabled.

10. The data processing apparatus according to claim 1, wherein when the data processing has been disabled and an amplitude of the input signal continues to be equal to or lower than another predetermined value for another predetermined time, the data processing is enabled.

11. The data processing apparatus according to claim 1, wherein the high-frequency noise recognition unit is prohibited from detecting the number of the peaks of the waveforms for another predetermined time beginning at occurrence of the waveforms.

12. The data processing apparatus according to claim 1, wherein:
   a plurality of different conditions for prohibition of the output of the determination result are stored, and the data processing is disabled on a basis of logical sum of the respective conditions.

13. A data processing apparatus for executing data processing with respect to an output of A/D conversion of an input signal, the data processing apparatus comprising:
   a constant-period noise recognition unit that detects a period of each waveform of the input signal and a rising time of each waveform from a rising edge of each waveform to a peak of each waveform, on a basis of the output of the A/D conversion, the constant-period noise recognition unit that determines whether or not waveforms having the substantially same period are input continuously and whether or not the rising times of the waveforms are shorter than a predetermined rising time, wherein:
   when the constant-period noise recognition unit determines that the waveforms having the substantially same period are input continuously and that the rising times of the waveforms are shorter than the predetermined rising time, the data processing is disabled.

14. The data processing apparatus according to claim 13, further comprising:
a determining section that executes the data processing with respect the output of the A/D conversion of the input signal, wherein:
when the constant-period noise recognition unit determines that the waveforms having the substantially same period are input continuously and that the rising times of the waveforms are shorter than the predetermined rising time, the constant period noise recognition unit disables the data processing executed by the determining section.

15. The data processing apparatus according to claim 13, further comprising:
a determining section that executes the data processing with respect the output of the A/D conversion of the input signal; and
a prohibiting section that prohibits an output of the determining section from being output to an outside of the data processing apparatus, when the constant-period noise recognition unit determines that the waveforms having the substantially same period are input continuously and that the rising times of the waveforms are shorter than the predetermined rising time.

16. The data processing apparatus according to claim 13, wherein the constant-period noise recognition unit integrates rising times of a particular number of waveforms to detect the rising times of the waveforms.

17. The data processing apparatus according to claim 13, wherein the constant-period noise recognition unit integrates the rising times of the waveforms for a predetermined time to determine whether or not the rising times of the waveforms are shorter than the predetermined rising time.

18. The data processing apparatus according to claim 13, wherein the constant-period noise recognition unit detects only a waveform having a period in a predetermined range.

19. The data processing apparatus according to claim 13, wherein when the constant-period noise recognition unit determines that the periods of the waveforms and the rising times of the waveforms are in respective predetermined ranges for a predetermined time, the data processing is disabled.

20. The data processing apparatus according to claim 13, wherein:
the determining unit selects a period of an nth waveform as a reference value where n is a natural number, and
the determining unit determines whether or not each waveform of the input signal is in a predetermined range from the reference value.

21. The data processing apparatus according to claim 13, wherein when an amplitude of each waveform is equal to or larger than another predetermined value, the constant-period noise recognition unit detects whether or not the waveforms having the substantially same period are input continuously and whether or not the rising times of the waveforms are shorter than the predetermined rising time.

22. The data processing apparatus according to claim 13, wherein:
the constant-period noise recognition unit detects the period of each waveform of the input signal and the rising time of each wave form for a predetermined time beginning at occurrence of the waveforms, and
after the constant-period noise recognition unit has determined that the waveforms having the substantially same period are not input continuously or that the rising times of the waveforms are equal to or longer than the predetermined rising time, the data processing is enabled.

23. The data processing apparatus according to claim 13, wherein when the data processing has been disabled and an amplitude of the input signal continues to be equal to or lower than a predetermined value for another predetermined time, the data processing is enabled.

24. The data processing apparatus according to claim 13, wherein the constant-period noise recognition unit is prohibited from detecting the period of each waveform of the input signal and the rising time of each waveform, for a predetermined time beginning at occurrence of the waveforms.

25. A data processing apparatus for executing data processing with respect to an output of A/D conversion of an input signal, the data processing apparatus comprising:
a noise recognition unit that comprises a high-pass filter to which the input signal is input, wherein:
when an output of the high-pass filter is equal to larger than a predetermined threshold value, the data processing is disabled.

26. The data processing apparatus according to claim 25, further comprising:
a comparing unit that compares the output of the high-pass filter with the predetermined threshold value; and
a determining section that executes the data processing with respect the output of the A/D conversion of the input signal, wherein:
when the comparing unit determines that the output of the high pass filter is equal to larger than the predetermined threshold value, the comparing unit disables the data processing executed by the determining section.

27. The data processing apparatus according to claim 26, wherein:
the comparing unit compares the output of the high-pass filter with the predetermined threshold value for a predetermined time beginning at occurrence of the waveforms, and after the comparing unit has determined that the output of the high-pass filter is less than the predetermined threshold value, the data processing is enabled.

28. The data processing apparatus according to claim 26, wherein the comparing unit is prohibited from comparing the output of the high-pass filter with the predetermined threshold value for a predetermined time beginning at occurrence of the waveforms.

29. The data processing apparatus according to claim 25, further comprising:
a comparing unit that compares the output of the high-pass filter with the predetermined threshold value;
a determining section that executes the data processing with respect the output of the A/D conversion of the input signal; and
a prohibiting section that prohibits an output of the determining section from being output to an outside of the data processing apparatus, when the comparing unit determines that the output of the high-pass filter is equal to larger than the predetermined threshold value.

30. The data processing apparatus according to claim 25, wherein when the data processing has been disabled and an amplitude of the input signal continues to be equal to or lower than another predetermined value for another predetermined time, the data processing is enabled.

* * * * *